(12) United States Patent
Turkaslan

(10) Patent No.: US 10,300,635 B2
(45) Date of Patent: May 28, 2019

(54) FIBER PRODUCTION SYSTEM AND PRODUCTION METHOD

(71) Applicant: KORDSA GLOBAL ENDÜSTRIYEL İPLIK VE KORD BEZI SANAYI VE TICARET ANONIM ŞIRKETI, Kocaeli (TR)

(72) Inventor: Ozlem Turkaslan, Kocaeli (TR)

(73) Assignee: KORDSA GLOBAL ENDÜSTRIVEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 176 days.

(21) Appl. No.: 15/119,125

(22) PCT Filed: Jan. 12, 2015

(86) PCT No.: PCT/TR2015/000009
§ 371 (c)(1),
(2) Date: Aug. 15, 2016

(87) PCT Pub. No.: WO2015/126338
PCT Pub. Date: Aug. 27, 2015

(65) Prior Publication Data
US 2017/0050346 A1    Feb. 23, 2017

(30) Foreign Application Priority Data
Feb. 18, 2014    (TR) .............................. a2014/01912

(51) Int. Cl.
*B29C 35/08*    (2006.01)
*D02J 13/00*    (2006.01)
(Continued)

(52) U.S. Cl.
CPC ...... *B29C 35/0805* (2013.01); *B29C 47/0014* (2013.01); *B29C 47/0898* (2013.01); *B29C 47/802* (2013.01); *B29C 47/8805* (2013.01); *B29C 47/8815* (2013.01); *B29C 47/92* (2013.01); *B65H 63/065* (2013.01); *D01D 5/08* (2013.01); *D01D 10/00* (2013.01); *D01D 10/02* (2013.01); *D01F 9/26* (2013.01); *D02J 13/005* (2013.01); *B29C 2035/0838* (2013.01); *B29C 2947/92295* (2013.01);
(Continued)

(58) Field of Classification Search
None
See application file for complete search history.

(56) References Cited

U.S. PATENT DOCUMENTS

| 6,497,952 B1 * | 12/2002 | Ohkoshi | D01D 10/02 428/364 |
| 2006/0182960 A1 * | 8/2006 | Suzuki | D02J 1/22 428/364 |
| 2007/0222104 A1 | 9/2007 | Sukuzi et al. | |

FOREIGN PATENT DOCUMENTS

DE    102005062826    6/2007

* cited by examiner

*Primary Examiner* — Nathan T Leong
(74) *Attorney, Agent, or Firm* — Gokalp Bayramoglu

(57) ABSTRACT

The present invention relates to a fiber production system (1) and production method which enables heat treatment applied during fiber production to be performed as applying laser on the fiber. The objective of the present invention is to provide a fiber production system (1) and production method which enables to perform momentary heat treatment on the filament (F) via laser beam (L) and which eliminates defected points in the filament structure by heating fast and drawing in fiber production.

14 Claims, 1 Drawing Sheet

(51) Int. Cl.
  *D01D 5/08* (2006.01)
  *D01D 10/00* (2006.01)
  *D01D 10/02* (2006.01)
  *D01F 9/26* (2006.01)
  *B65H 63/06* (2006.01)
  *B29C 47/00* (2006.01)
  *B29C 47/08* (2006.01)
  *B29C 47/80* (2006.01)
  *B29C 47/88* (2006.01)
  *B29C 47/92* (2006.01)
  *B29K 67/00* (2006.01)
  *B29L 31/00* (2006.01)

(52) U.S. Cl.
  CPC ............... *B29C 2947/92428* (2013.01); *B29C 2947/92704* (2013.01); *B29C 2947/92923* (2013.01); *B29K 2067/003* (2013.01); *B29L 2031/731* (2013.01); *B65H 2701/3132* (2013.01)

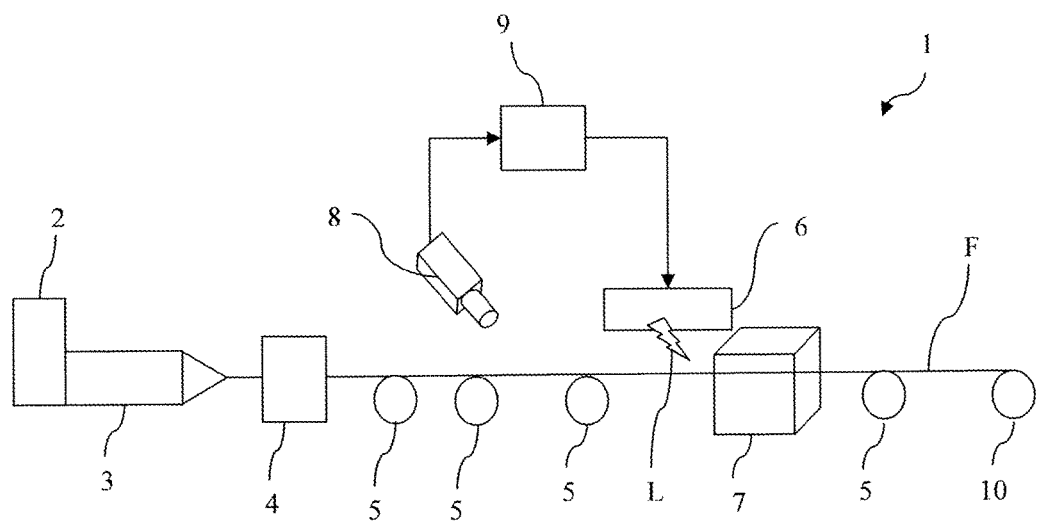

FIBER PRODUCTION SYSTEM AND PRODUCTION METHOD

FIELD OF THE INVENTION

The present invention relates to a fiber production system and production method which enables heat treatment applied during fiber production to be performed as applying laser on the fiber.

BACKGROUND OF THE INVENTION

Fiber production is realized by heating and drawing polyester (such as polyethylene terephthalate, polyethylene naphthalate and polylactic acid) and polyamide (polyamide 6, polyamide 66) thermoplastics. During fiber production, heat treatment which is applied in order to draw fiber material in yarn form is generally performed via heated rollers and chambers along the line. In heated chambers used in heating the material used in fiber production, hot air or vapor application is performed. In this way, yarn is annealed and the given form is enabled to be preserved. For heating, conventional methods, infrared beams and vapor are currently preferred. Heat treatment allows plasticization and drawing of the fiber material by means of heat in fiber production process. Furthermore, heat treatments applied for the crystallization of fiber by annealing at a temperature close to crystallization are provided via the abovementioned methods.

The thermal conductivity of polymers used in fiber production, for example polyester (polyethylene terephthalate, polyethylene naphthalate, polilactic acid etc.), polyamide (polyamide 6, polyamide 66 etc.) is low. For this reason, heat is not distributed homogenously along fiber during heat treatment. The distance to the heat source during process can prevent the heat from reaching regularly and continuously to the fiber and can cause the surface and inside of the fiber to cool differently (to form "skin-core" structure).

SUMMARY OF THE INVENTION

The objective of the present invention is to provide a fiber production system and production method which enables to perform momentary heat treatment on the filament via laser, and which eliminates defected points in the filament structure by drawing in fiber production.

BRIEF DESCRIPTION OF THE DRAWINGS

A fiber production system and production method developed to fulfill the objective of the present invention is illustrated in the accompanying FIGURE, in which;

FIG. 1 is the schematic view of the inventive fiber production system.

The components shown in the figures are each given reference numbers as follows:
1. Fiber production system
2. Molten formation member
3. Extrusion member
4. Cooling unit
5. Roller
6. Mobile laser device
7. Heated chamber
8. Camera
9. Control member
10. Winding machine
F. Filament
L. Laser beam

DETAILED DESCRIPTION OF THE INVENTION

In conventional fiber production systems, heat cannot be applied homogenously on the fiber material due to the methods that are applied, and it cannot penetrate into whole structure of the material; accordingly the inventive fiber production system (1), which prevents the skin-core structure, formed in the fiber and/or eliminates this structure, comprises
- at least one molten forming member (2) which enables the polymeric crude material to be used in fiber production to be heated and melted,
- at least one extrusion member (3) which enables the molten crude material to be passed through at least one spinneret at its end part,
- at least one cooling unit (4) which provides filament structure to the crude material going out of the extrusion member (3) and passing through the spinnerets by cooling it,
- rollers (5) which enables the crude material to be heated to glass transition temperature or crystallization temperature and/or above it and the fiber material in filament form to reach a certain crystallinity by being drawn at a certain tension,
- at least one mobile laser device (6) which enables to form a balanced heat distribution and thus the defect in the filament structure to be eliminated by drawing via heat and the rollers by applying laser beam (L) on the filament (F) during drawing the filaments (F) with the rollers (5),
- at least one heated chamber (7) which is located between any two rollers, preferably before the fourth roller, applying heat on the material in order to increase crystallinity in the fiber material drawn with the rollers (5), and enabling the continuity of the filament structure provided to the material.
- at least one winding machine (10) which is used for packing in the form of bobbin the material brought to filament structure during packaging.

In the preferred embodiment of the invention, thermoplastic material is used as fiber crude material. This material can preferably be polyethylene terephthalate.

In a preferred embodiment of the invention, a control member (9) guides the mobile laser device (6) to the related part according to the data it receives from a camera (8) which can detect defected points in the filament structure during the filaments (F) being drawn by the rollers (5), and enables the parts having defected points to be heated and corrected by being drawn by the rollers by applying laser beam (L) locally on the filament structure.

In the preferred embodiment of the invention, the laser device (6) applying laser beam (L) on the fiber material is a device which applies carbon dioxide laser.

In the preferred embodiment of the invention, the laser device (6) applying laser beam (L) on the fiber material is a carbon dioxide laser device in 10.6 μm wavelength and pulse form.

In another embodiment of the invention, the laser device (6) applying laser beam (L) on the fiber material is a fiber laser device.

The fiber production method which is the operation method of the inventive fiber production system (1) comprises the steps of
- melting the crude material to be used in fiber production by heating, passing the molten crude material through spinneret or spinnerets, bringing the crude materials passed through to spinnerets into filament structure by passing through the cooling unit (4), heating the crude material above glass transition temperature and drawing it, heating the crude material to crystallization temperature or above it and drawing it, drawing the heated crude material in filament from with the heated rollers (5), heating with mobile laser beam (L) in order to increase crystallinity in the fiber material and correcting the defected points with heat and tension, drawing the filaments by being passed through the heated chamber (7) which is located between any two rollers, preferably before the fourth roller, in order to fix the filament structure, obtaining the final product.

In the preferred embodiment of the invention, in step of drawing the filaments (F) with heated rollers (5), laser beam (L) is applied on the filament structure while moving between two heated rollers (5), and a homogenous heat distribution is enabled and the defected point is eliminated by heating and drawing.

In the preferred embodiment of the invention, in step of drawing the filaments (F) between the cooling unit (4) and the winding machine (11), laser beam is applied on the defected point on the filament structure while moving between the heated rollers (5) and the heated chamber (7), and a homogenous heat distribution is enabled and the defected point is eliminated by heating and drawing.

In the preferred embodiment of the invention, in step of passing the molten crude material through spinneret or spinnerets, the crude material is kept in range of 270° C.-300° C.

In the preferred embodiment of the invention, in step of heating the crude material above the glass transition temperature, the crude material is heated to 80° C. and above via the first roller (5) according to the transmission direction.

In the preferred embodiment of the invention, in step of heating the crude material above the crystallization temperature, the crude material is heated to 100° C. and above via the second roller (5) according to the drawing direction.

In the preferred embodiment of the invention, in step of drawing the heated crude material in filament form with the heated rollers, the crude material is heated to 200° C. and above via the third roller (5) according to the transmission direction.

In the preferred embodiment of the invention, in step of drawing the heated crude material in filament form with the heated rollers, the fourth roller (5) is kept at room temperature according to the transmission direction of the crude material, and it is rotated slower relative to the third roller (5) and the tension on the fiber is decreased.

In the preferred embodiment of the invention, in step of drawing the filaments by passing through the heated chamber (7) in order to fix the filament structure, the heated chamber (7) is heated to 200° C. and above.

The invention can be used in fiber production manufactured from thermoplastic. The thermoplastic molten is first passed through spinnerets (multifilament) or a single spinneret (monofilament), and then it is cooled with air blowing cooling unit (4) (for thin yarns) or water bath (for thick yarns). Then, the cooled material is heated above glass transition temperature and then the crystallization temperature, slipped over the heated rollers (5) and drawn by being passed through the heated chamber (7), the crystallinity is increased and the structure which is formed is fixed.

In the inventive production system (1), laser beam (L) is directed to the point with the deformation in a mobile way; it can be drawn better, fast, momentarily and by subjected to high temperature, and better orientation can be provided.

By means of applying laser beam (L) on the filament (F), heat can be given to the filament (F) in a fast and momentary way and the heat can penetrate into the filament along its thickness, and this prevents thermal degradation which can occur in the filament structure that can be subjected to another heat source for long time. Especially during the production of the monofilaments, the surface cooling faster than the inside causes the formation of a layered structure called as "skin-core" in the monofilament structure. Accordingly, this problem can be avoided by using the inventive method especially in monofilament production, and a homogenous structure can be provided with fast, momentary heating along the thickness and then drawing. The heat generated with laser (L) can penetrate into the fiber, being different from any other heat source, and the formation of "skin-core" structure caused by unwanted, different cooling can be prevented. The inventive production method will also provide significant use in production of thermoplastic fibers which do not have thermal conductivity or the thermal conductivity of which is low. Since there is a single yarn in monofilament process and it is slower relative to multifilament process, it is thought that the laser application will be more effective in monofilament production. In the inventive production method, the laser (L) to be applied on the fiber material can be carbon dioxide laser or fiber laser which is a new technology.

By means of the inventive method, during fiber process, the fiber will be subjected to direct, fast, momentary heat not only from the outside but also from the inside. During fiber drawing with this method, laser is directed to a deformation point that can be detected with fast camera; the area softening with the effect of heat can be drawn without crusting or degradation. The fiber will be subjected to heat for a shorter time by applying highly effective, localized and homogenous heat, and thus thermal degradation will be decreased. Crystallization will be more uniform by means of the heat distribution being homogenous. Furthermore, it is believed that the drawability of the polymeric fiber will increase by means of laser application.

The invention claimed is:

1. A fiber production system, for preventing the skin-core structure formed in the fiber and/or eliminating this structure, comprising:
    at least one molten forming member configured to heat and melt a polymeric crude material to be used in fiber production,
    at least one extrusion member configured to pass the molten polymeric crude material through at least one spinneret at its an end part of the at least one extrusion member,
    at least one cooling unit providing a filament structure to the polymeric crude material going out of the at least one extrusion member by cooling the polymeric crude material, a plurality of rollers configured to heat the polymeric crude material at a temperature above a glass transition temperature or a crystallization temperature, and the fiber material in filament form to reach a predetermined crystallinity by being drawn at a predetermined tension,
    at least one mobile laser device configured to apply laser beam on the filament during drawing the filaments with the rollers to form a balanced heat distribution for eliminating defects in the filament structure, at least one heated chamber located between two adjacent rollers for applying heat on the fiber material in order to increase crystallinity in the fiber material drawn with the rollers, and enabling the continuity of the filament structure provided to the fiber material, at least one control member to guide the mobile laser device to an area according to data received from at least one camera, wherein the at least one camera detects defected points in the filament structure during the filament material being drawn by the plurality of rollers, and to correct the areas with defected points with heat and drawing by applying the laser beam locally on the filament structure, at least one winding machine for packing the filament material in a form of bobbin for packaging, wherein all rollers are arranged linearly between the at least one cooling unit and the at least one winding machine.

2. The fiber production system according to claim 1, wherein the fiber crude material is polyethylene terephthalate material.

3. The fiber production system according to claim 1, wherein the mobile laser device is a carbon dioxide laser.

4. The fiber production system according to claim 3, wherein the mobile laser device applies the laser beam of 10.6 μm wavelength and in a pulse form.

5. The fiber production system according to claim 3, wherein the plurality of rollers include a first roller, a second roller, a third rollers and a fourth roller sequentially arranged between the at least one cooling unit and the at least one winding machine, wherein the at least one heated chamber is located between the third roller and the fourth roller.

6. The fiber production system according to claim 1, wherein the mobile laser device is a fiber laser device.

7. A fiber production method, using the fiber production system of claim 1, wherein
the fiber production method comprising the steps of:
melting the crude material to be used in fiber production by heating,
passing the molten crude material through the spinneret or spinnerets,
bringing the crude materials passed through the spinnerets into filament structure by passing through the cooling unit,
heating the crude material above the glass transition temperature and drawing it,
heating the crude material above the crystallization temperature and drawing it,
drawing the heated crude material in filament from with the heated rollers,
heating with the mobile laser beam in order to increase crystallinity in the fiber material and correcting the defected points with heat and by drawing,
drawing the filaments by being passed through the heated chamber in order to fix the filament structure,
obtaining a final product.

8. The fiber production method according to claim 7, wherein homogenous heat distribution is provided and the defected point is eliminated with tension by means of applying the laser beam on the defected point on the filament structure while moving between two heated rollers in step of drawing the filaments with the heated rollers.

9. The fiber production method according to claim 7, wherein the laser beam is applied on the defected point on the filament structure while moving between the heated rollers and the heated chamber, and a homogenous heat distribution is enabled and the defected point is eliminated by heating and drawing, in step of drawing the filaments between the cooling unit and the winding machine.

10. The fiber production method according to claim 7, wherein the crude material is kept in range of 270° C.-300° C. in the step of passing the molten crude material through the spinneret or spinnerets.

11. The fiber production method according to claim 7, wherein the crude material is heated to 80° C. and above via the first roller according to the transmission direction in the step of heating the crude material above the glass transition temperature.

12. The fiber production method according to claim 7, wherein the crude material is heated to 100° C. and above via the second roller according to the transmission direction in the step of heating the crude material above the crystallization temperature.

13. The fiber production method according to claim 7, wherein the heated crude material in filament form is heated to 200° C. and above via the third roller according to the transmission direction.

14. The fiber production method according to claim 7, wherein the preferred embodiment of the invention the heated chamber is heated to 200° C. and above in the step of drawing the filaments by passing through the heated chamber in order to fix filament structure.

* * * * *